US006478051B1

(12) United States Patent
Drumm et al.

(10) Patent No.: US 6,478,051 B1
(45) Date of Patent: Nov. 12, 2002

(54) PRESSURE MEANS STORAGE DEVICE

(75) Inventors: Stefan Drumm, Saulheim (DE); Christian Albrich Von Albrichsfeld, Darmstadt (DE); Ronald Bayer, Mühlheim/Main (DE); Peter Rieth, Eltville (DE); Manfred Rüffer, Sulzbach (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/856,772

(22) PCT Filed: Nov. 16, 1999

(86) PCT No.: PCT/EP99/08811

§ 371 (c)(1),
(2), (4) Date: Aug. 1, 2001

(87) PCT Pub. No.: WO00/31420

PCT Pub. Date: Jun. 2, 2000

(30) Foreign Application Priority Data

Nov. 25, 1998 (DE) ........................................ 198 54 408
Feb. 18, 1999 (DE) ........................................ 199 06 800

(51) Int. Cl.$^7$ ................................................ F16L 55/04
(52) U.S. Cl. ........................................... 138/30; 138/31
(58) Field of Search ..................................... 138/30, 31

(56) References Cited

U.S. PATENT DOCUMENTS 4,068,684 A 1/1978 Greer
4,136,714 A * 1/1979 Jones .......................... 138/30
4,164,242 A * 8/1979 Sandau ........................ 138/30
4,526,205 A * 7/1985 Sugimura et al. ............. 138/30
4,527,580 A * 7/1985 Chheda ......................... 137/1
4,691,739 A * 9/1987 Gooden ....................... 138/31
4,784,182 A * 11/1988 Sugimura .................... 138/30
6,189,572 B1 * 2/2001 Ruffer et al. ................. 138/30
6,286,552 B1 * 9/2001 Shimbori et al. ............. 138/30
6,322,338 B1 * 11/2001 Nishio ......................... 138/30

FOREIGN PATENT DOCUMENTS

| | | |
|---|---|---|
| CH | 450 924 | 1/1968 |
| DE | 12 32 418 | 11/1964 |
| DE | 16 27 828 | 4/1970 |
| DE | 71 03 342 | 8/1971 |
| JP | 02 113139 | 4/1990 |
| WO | 98 37329 | 8/1998 |

OTHER PUBLICATIONS

Search Report of the German Patent Office for Application No. 199 06 800.3, Nov. 1999.

* cited by examiner

*Primary Examiner*—James Hook
(74) *Attorney, Agent, or Firm*—Rader, Fishman & Grauer PLLC

(57) ABSTRACT

The present invention discloses a pressure fluid accumulator with a housing having its interior subdivided into two chambers by a media-separating element, the first chamber being filled with a gas and the second chamber being filled with a liquid, and wherein in a hydraulic port a bottom valve is provided whose closure member is operable by the media-separating element and which permits filling the second chamber with liquid and prevents complete evacuation of the second chamber. In order to prevent a damage of the bottom valve and an inadvertent escape of fluid and, thus, ensure a considerable increase in the reliability in operation, according to the present invention, the closure member can be moved by the media-separating element to adopt a position in which it fulfils the function of a hydraulic piston.

17 Claims, 6 Drawing Sheets

PRESSURE MEANS STORAGE DEVICE

TECHNICAL FIELD

The present invention generally relates to vehicle brake systems and more particularly relates to a pressure fluid accumulator for use in vehicle brake systems.

BACKGROUND OF THE INVENTION

A pressure fluid accumulator of this general type is disclosed in international patent application WO 98/37329. The media-separating element in the prior art pressure fluid accumulator is configured as a metallic pleated bellows, and the closure member of the bottom valve is connected to the end surface close to the hydraulic port of this bellows by means of a spring. To achieve effective closure of the hydraulic port, the closure member includes a rubber-elastic sealing element.

A shortcoming from which the prior art accumulator suffers is the condition that the closing slot which develops when the closure member moves to sit on the bottom is penetrated by the pressure fluid so that there is the imminent risk of damage or destruction of the sealing element and, hence, failure of the pressure fluid accumulator. Another disadvantage is seen in the escape of pressure fluid which may be caused by an expansion of the pleated bellows due to temperature variations.

In view of the above, an object of the present invention is to improve upon a pressure fluid accumulator of the above-mentioned type to such effect that damage of the bottom valve and inadvertent pressure fluid escape is prevented and, thus, the reliability in operation is considerably increased.

According to the present invention, this object is achieved in that the closure member can be moved by the media-separating element to adopt a position in which it fulfils the function of a hydraulic piston. This is achieved in that the closure member, upon approach of the end surface of the pleated bellows on the bottom, is moved into the hydraulic flow without inhibiting it, and subsequently, when floating in the hydraulic flow, is moved into abutment on a stop, with the result that the hydraulic port is closed in the way of a locked hydraulic piston.

To render the idea of the present invention more precise, the closure member is guided in a bore provided in the hydraulic port and includes at least one sealing element which provides a sealant vis-à-vis the wall of the bore. The bore is preferably configured as a stepped bore, and the sealing element cooperates with the small-diameter portion of the bore.

DETAILED DESCRIPTION OF THE PREFERRED EMBODIMENTS

Figure 1:
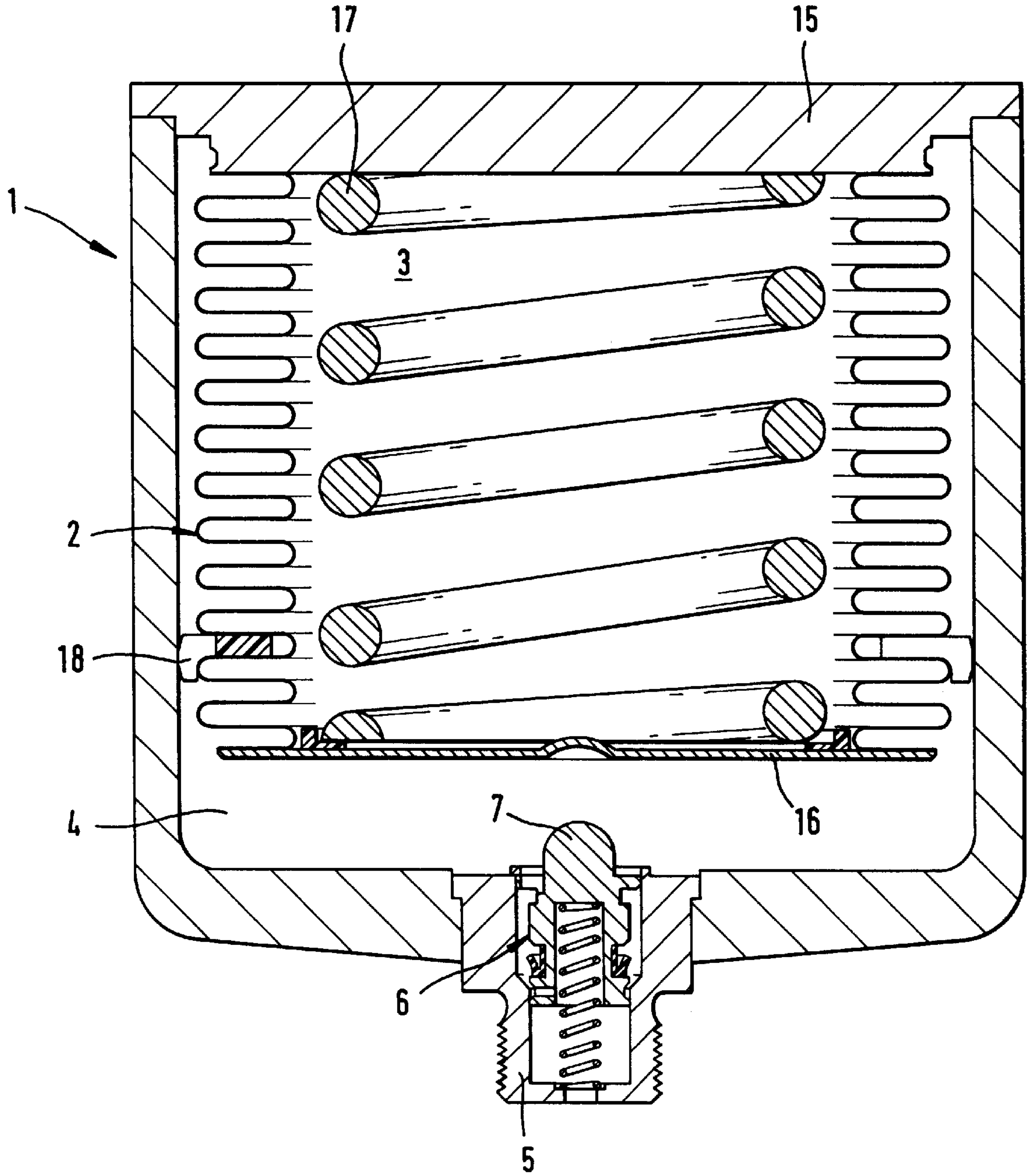
FIG. 1 is an axial cross-sectional view of a first embodiment of the pressure fluid accumulator of the present invention.

The first embodiment of the pressure fluid accumulator of the present invention as illustrated in FIG. 1 has a housing 1, with its interior subdivided into two pressure compartments or chambers 3, 4 by means of a media-separating element 2. The media-separating element 2 is preferably formed by a thin-walled metallic pleated bellows which is connected pressure-tightly to a cover 15 that closes the housing, on the one hand, and is closed by a plate 16, on the other hand. The interior of the pleated bellows 2 is the first chamber 3 which can be filled with a gas that is usually under high pressure by way of a fill port (not shown) provided in the cover 15. In the bottom part of the housing 1, a hydraulic port 5 is provided in which a bottom valve 6 is arranged whose closure member 7 projects into the second chamber 4. The bottom valve 6 is preferably configured so that it permits filling the second chamber 4 with a pressurized fluid, such as a brake fluid, on the one hand, and prevents complete evacuation of the second chamber 4, on the other hand. Further, the first chamber 3 houses a compression spring 17 which is compressed between the cover 15 and the above-mentioned plate 16 and, thus, preloads the pleated bellows 2 in the direction of the bottom valve 6. This ensures that the hydraulic pressure which prevails in the second chamber 4 is always higher than the gas pressure that prevails in the first chamber 3. To finally achieve centering of the pleated bellows 2 in the housing 1, there is provision of a slotted ring 18 which embraces the pleated bellows 2 and, in the assembled condition, abuts on the wall of the housing 1.

Figure 2:
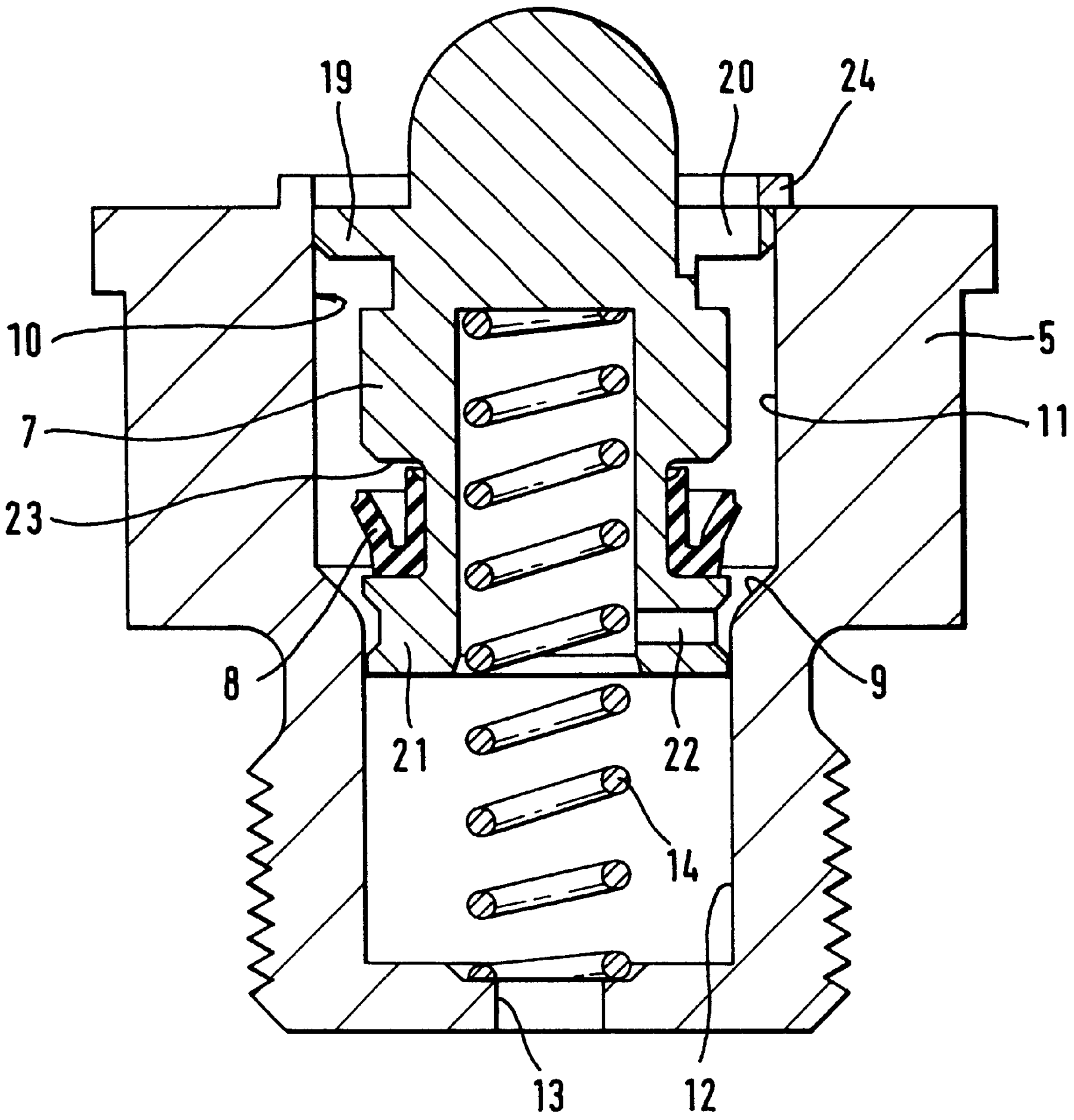
FIG. 2 is an axial cross-sectional view of the bottom valve used in the embodiment of FIG. 1 in its opened condition.

As can be taken from FIG. 2 in particular, the hydraulic port 5 that includes a fill or evacuation port 13 has a bore 10 which is designed as a stepped bore and is comprised of a first portion 11 of large diameter and a second portion 12 of small diameter. The transition area between the two portions 11, 12 is preferably a conical annular surface 9. The above-mentioned closure member 7 is guided in the stepped bore 10 and 11, 12, respectively, there being provision of a collar 19 with at least one passage 20 for guiding in the first bore portion 11, while for guiding in the second bore portion 12 a second collar 21 is used which has several radial flow ducts 22. The flow ducts 22 along with the above-mentioned passage 20 provide a flow connection between the second chamber 4 and the fill or evacuation port 13 of the hydraulic port 5. An end surface of the second collar 21 which is remote from the fill or evacuation port 13 provides a flank of a radial groove 23 which receives a sealing element 8 that is a sealing cup in the embodiment shown. In the opened condition of the bottom valve 6 shown in FIG. 2, the first collar 19 bears against a stop 24 under preload by a compression spring 14.

Figure 2B:
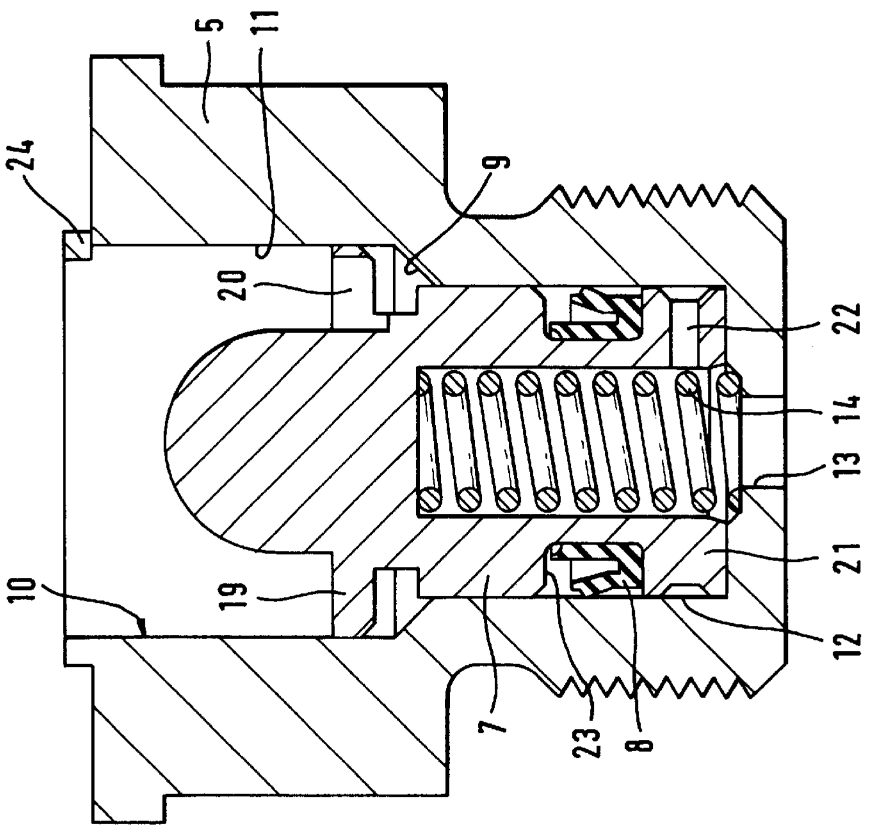
FIGS. 2*a* and 2*b* is a view of the bottom valve according to FIG. 2 in the transition condition or in the closed condition.
Figure 2A:
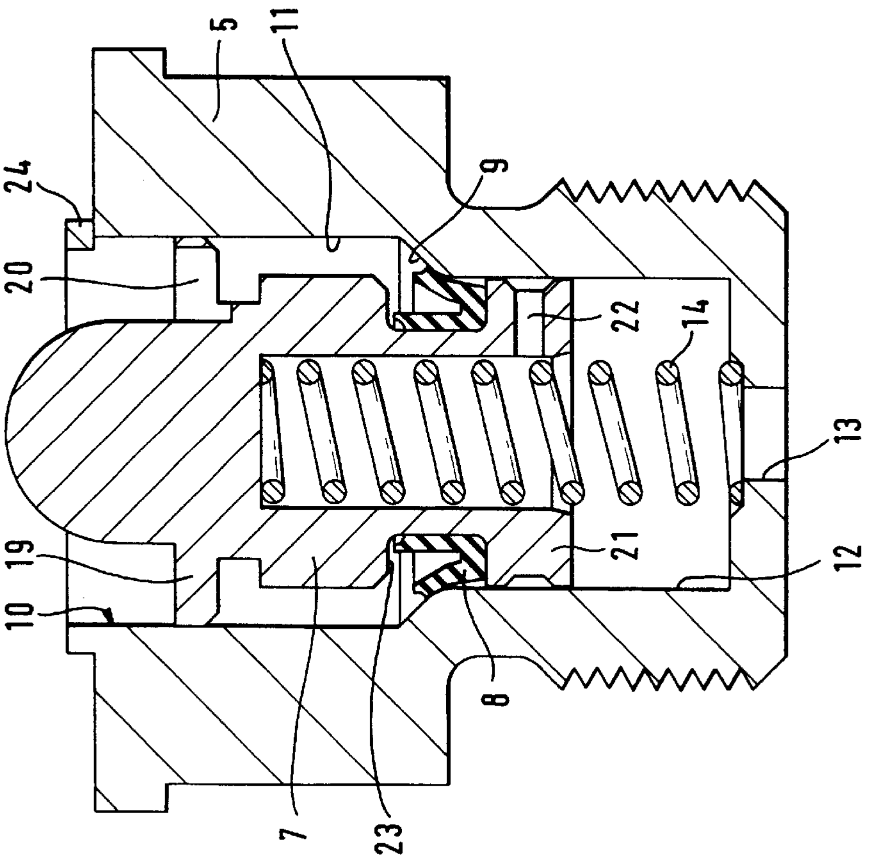

Closing of the bottom valve 6 takes place in two periods which are illustrated in FIGS. 2*a* and 2*b*. Shortly before the evacuation of the chamber 4, the plate 16 that closes the pleated bellows 2 starts touching the end of the closure member 7 which preferably has a semispherical design. Upon continued discharge of the pressure fluid, the closure member 7 is displaced in opposition to the force generated by the compression spring 14 or urged downwards in the drawing until the outside sealing lip of the sealing cup 8 moves into contact with the conical annular surface 13 and, thus, prevents fluid circulation around the closure member 7. The closure member 7 starts in this moment to fulfil the function of a hydraulic piston and is displaced further downwards by the residual pressure that prevails in the chamber 4. This causes displacement of the sealing element 8 into the bore portion 12 whose diameter will not change. Only small pressure differences may occur at the sealing cup 8 in the actions so far discussed, the said differences corresponding to the spring forces, friction forces, and inertia forces which act on the closure member 7. This situation changes as soon as the closure member 7 has reached its bottom stop and is supported on the housing 1 with a force of any rate. Due to the large pressure differences which the sealing cup 8 has to withhold, the sealing cup 8 is loaded statically with an optimally small metallic sealing slot that is, above all, constant with time. The condition which has just be described, in which the sealing element 8 fulfils the function of a non-return valve that opens in the direction of the second chamber 4 is illustrated in FIG. 2*b*.

The bottom valve 6 is opened because liquid pressure fluid is pumped from the outside into the pressure fluid accumulator 1 according to the present invention. When the charging pressure exceeds the residual pressure or internal pressure that prevails in the chamber 4, the external sealing lip of the sealing cup 8 turns about, thereby permitting pressure fluid to flow in through the sealing slot confined by the wall of the bore portion 12, with the compression spring 14 simultaneously sliding back the closure member 7. The result is that the sealing cup 8 or its outside sealing lip detaches from the bore wall and gives way to the inflowing pressure fluid. Exactly as in the closing process, the contour of the annular chamber which accommodates the sealing cup 8 changes only when the pressure difference that prevails at the sealing cup is low. The closure member 7 is urged further upwards by the compression spring 14 until it abuts on the plate 16 again that closes the pleated bellows 2. With continued filling of the chamber 4, the plate 16 will retreat, and the travel of the closure member 7 is limited by the upper stop 24.

Figure 3:
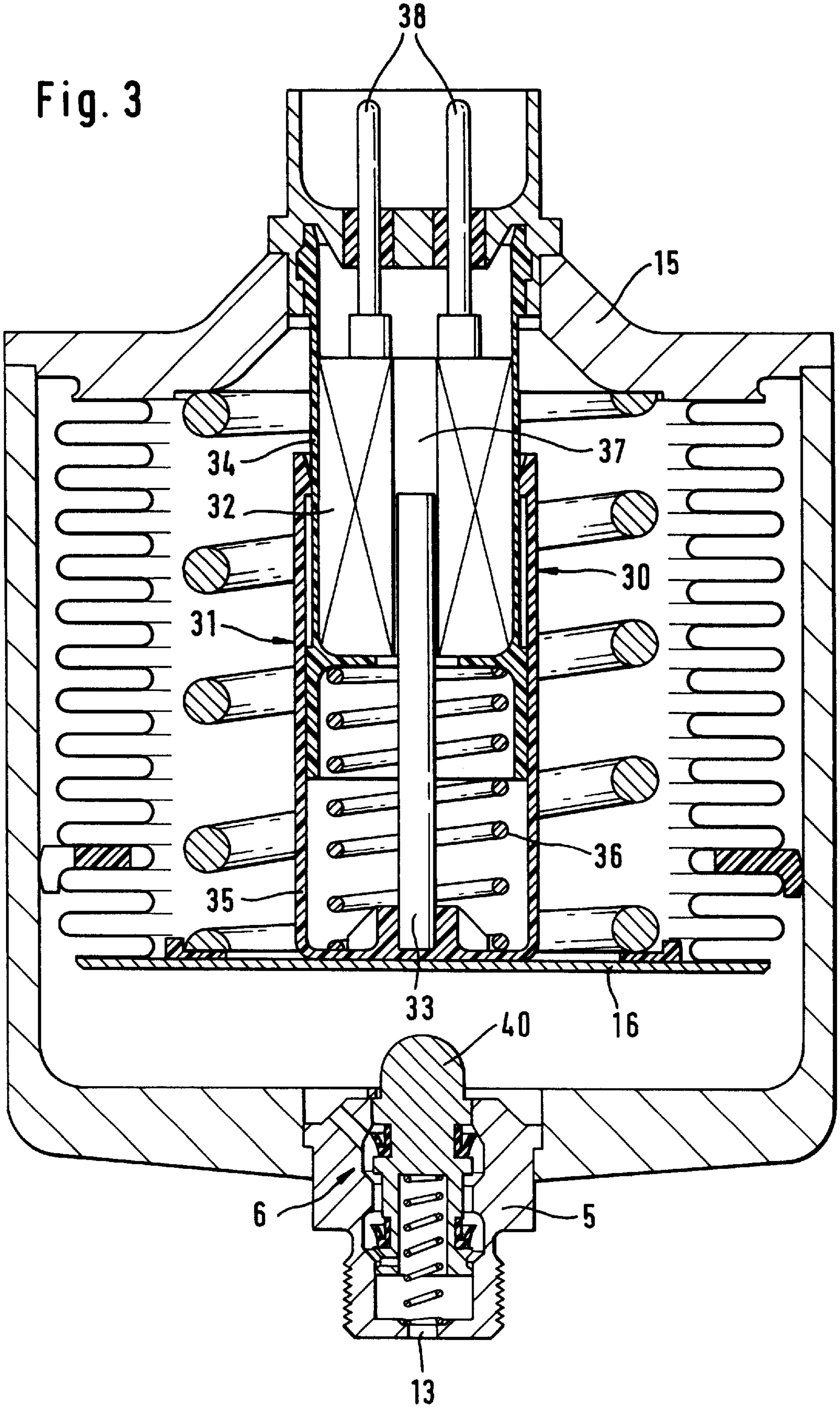
FIG. 3 is an axial cross-sectional view of a second embodiment of the pressure fluid accumulator of the present invention.

In the second design of the object of the present invention illustrated in FIG. 3, a sensor device 30 for sensing the movement of the media-separating element 2 is provided in the chamber 3 filled with gas. The sensor device 30 which is preferably configured as an inductive travel sensor, represents an assembly which is independent to handle and can be inserted into an opening in the cover 15. The assembly is comprised of a two-part sensor housing 31 in which a coil 32 and a metallic pin 33 cooperating with the coil 32 are mainly arranged. The two-part sensor housing 31 is preferably composed of telescopically guided housing parts 34, 35, and the part 34 close to the opening in the cover 15 takes up the coil 32, while the second housing part 35 which partly embraces the first housing part 34 is supported on the plate 16 under the preload of a compression spring 36. Fastened on the side of the second housing part 35 remote from the plate 16 is the above-mentioned pin 33 which is guided in the first housing part 34 and projects in part into a cylindrical chamber 37 designed inside the coil 32. Electrical connections of the sensor device 30 are formed by the contact pins 38 which project from the sensor housing 31. By means of a non-illustrated electronic evaluating unit connected to the electrical connections, the inductance of the coil 32 can be determined which changes in response to the depth of immersion of the metallic pin 33 into the cylindrical chamber 37 that is encompassed by the coil 32. The position of the plate 16 and, from this, the fill condition of the pressure fluid accumulator of the present invention is determined from the measured inductance with the aid of characteristic curves stored in the electronic evaluating unit. Further, electrical measurement means (not shown) can be provided within the scope of the idea of the present invention, which means serve for measuring the electrical resistance of the coil 32 in addition to the measurement of the inductance, and the test value thereof is used to determine the temperature of the accumulator.

FIG. 3 shows also a modified design of the bottom valve 6, whose closure member 40 is provided with two sealing elements 41, 42 arranged one behind the other in order to reduce the probability of failure.

Figure 4C:
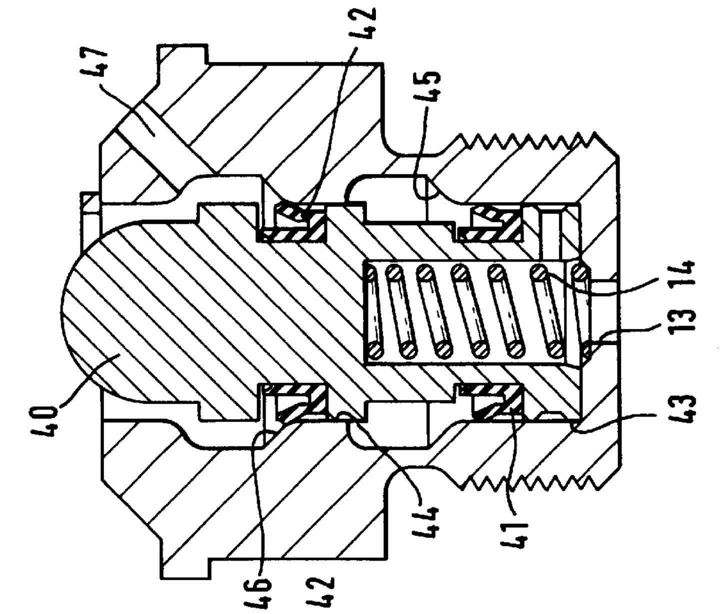
FIGS. 4*a* to 4*c* are axial cross-sectional views of the bottom valve used in the embodiment of FIG. 3 in different conditions.
Figure 4B:
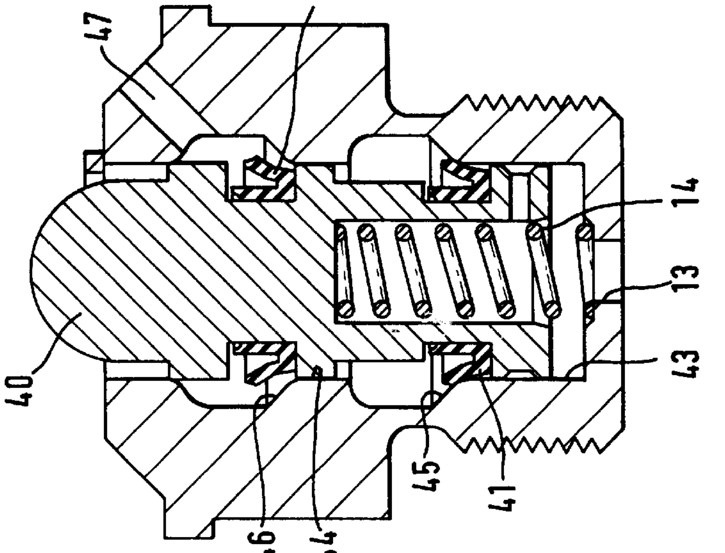
Figure 4A:
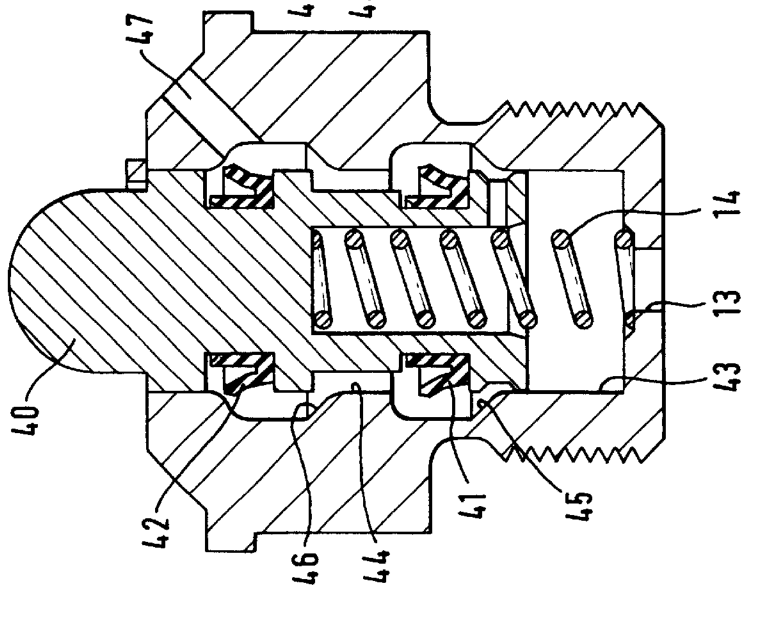

As can be taken in particular from FIGS. 4*a* to 4*c* which represent the individual phases of the closing operation, the sealing elements 41, 42 which again are configured as sealing cups cooperate with two separated portions 43, 44 of a bore stepped several times (not shown in detail) that is provided in the hydraulic port 5. The closing travels of the two sealing elements 41, 42 are preferably rated so that the sealing elements 41, 42 move into abutment on the associated bore portions 43, 44 offset in time. As becomes apparent from FIG. 4*b* in particular, when the closure member 40 is displaced by the above-mentioned plate 16, the external sealing lip of the first sealing cup 41 is the first to come into contact with a first conical annular surface 45 following which is the associated bore portion 43. The second sealing cup 42 is still at a distance from an associated second conical annular surface 46 so that the pressure fluid which propagates through a flow duct 47 provided in the hydraulic port 5 is applied to the first sealing cup 41, and the closure member 40 is displaced further in the direction of the bottom stop by the effect of the pressure fluid. During the mentioned closing movement, the second sealing cup 42 first of all comes into contact with the conical annular surface 46 associated with it and finally, in the closing position (FIG. 4*c*) seals in relation to the associated bore portion 44.

Figure 5:
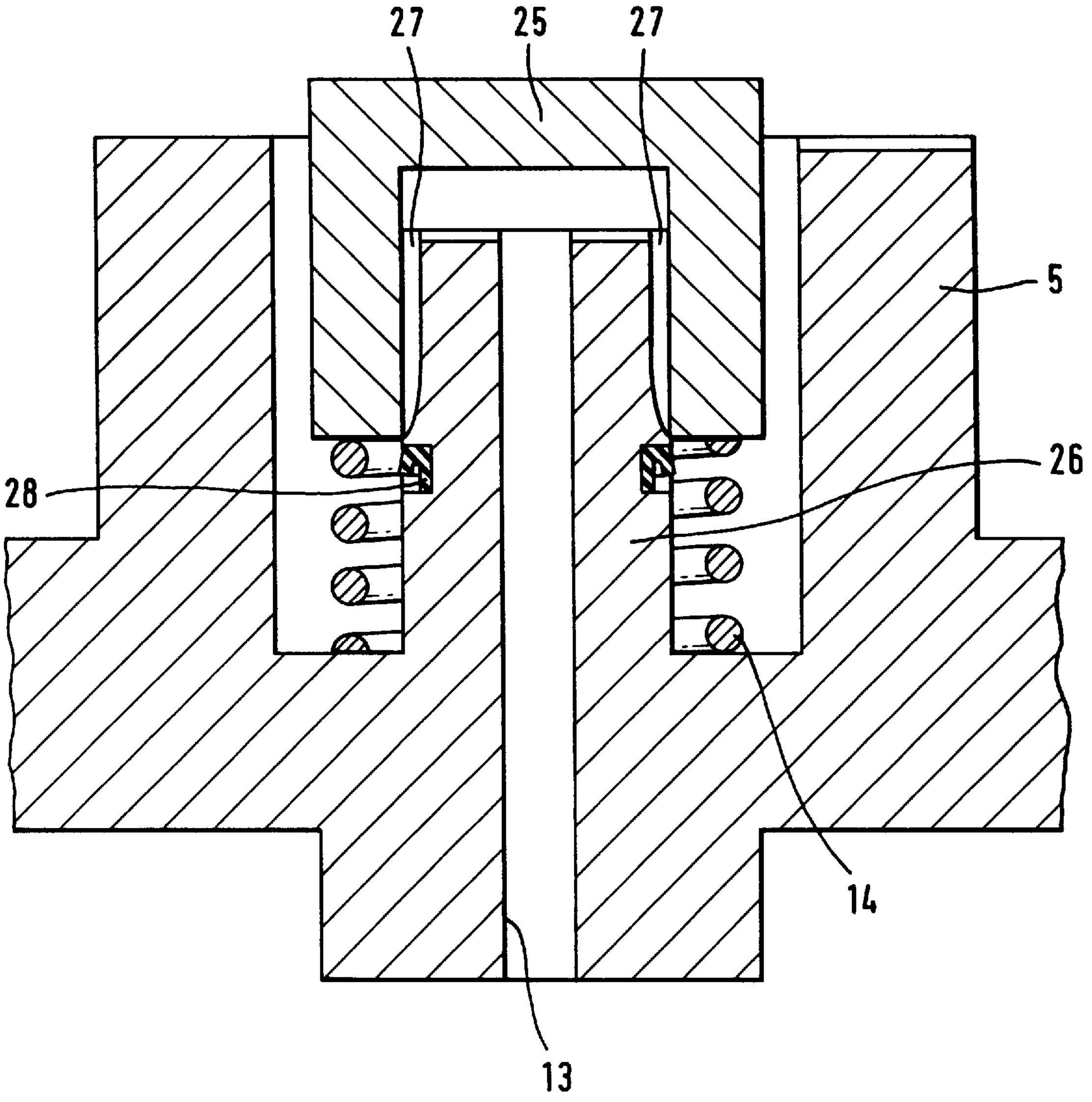
FIG. 5 is an axial cross-sectional view of a third embodiment of the bottom valve.

In a third design of the bottom valve illustrated in FIG. 5, flow cross-sections 27 are designed in a preferably cylindrical guide portion 26 and limited towards the outside by a sleeve 25 which forms the above-mentioned closing member. In the actuating direction of the bottom valve behind the flow cross-sections 27, there is a sealing cup 28 which, after having been overridden by the sleeve 25, seals in relation thereto and thus prevents further flow of pressure fluid.

Concludingly, it is to be noted that all embodiments of the bottom valve described hereinabove are easy to design and likewise permit simple and low-cost manufacture. The bottom valves can be installed as prefabricated, tested modules into hydraulic accumulators equipped with metallic bellows. The sealing elements or sealing cups are acted upon by pressure only in situations in which the sealing slot has adopted its final contour and will change no more. This function principle prevents the sealing elements from being damaged by parts of the sealing elements that are sheared off at metal edges. Another advantage includes that both the opened and the closed condition of the bottom valve is mechanically stable. The result is that transitions between an open and a closed condition of the bottom valve which are caused by an expansion due to temperature are avoided. Especially, no fluid is allowed to escape during storage of the pressure fluid accumulator when the pressure applied from outside is equal to zero.

What is claimed is:

1. Pressure fluid accumulator, comprising:

a housing having its interior subdivided into first and second chambers by a media-separating element, wherein the first chamber is filled with a gas and the second chamber is filled with a liquid, a hydraulic port coupled to said housing, a bottom valve coupled to said hydraulic port, said bottom valve including a first bore having parallel side walls, a closure member adapted to reciprocate within said bottom valve first bore, wherein said closure member is operable by the media-separating element and which permits filling the second chamber with fluid from an evacuation port of said bottom valve and prevents complete evacuation of the second chamber, wherein the closure member includes a first cup seal disposed around an outer periphery of said closure member, wherein said cup engages and slides along the parallel side walls of the first bore to effect a hydraulic seal between the second chamber and the evacuation port, and wherein the closure member is movable within said first bore by the media-separating element.

2. Pressure fluid accumulator as claimed in claim 1, wherein the first bore is configured as a stepped bore having a large diameter portion and a small diameter portion, wherein the sealing element cooperates with the small-diameter portion of the bore.

3. Pressure fluid accumulator as claimed in claim 2, wherein a conical annular surface is provided between the large-diameter portion and the small-diameter portion of the bore.

4. Pressure fluid accumulator as claimed in claim 1, wherein the closure member is movable by the media-separating element to adopt a position in which the cup seal is moved into abutment on the conical annular surface.

5. Pressure fluid accumulator as claimed in claim 1, wherein the closure member is formed of a sleeve which radially bounds flow cross-sections designed in a cylindrical guide portion and cooperates with a cup seal.

6. Pressure fluid accumulator as claimed in claim 1, wherein the closure member is urged by a spring in opposition to the actuating direction of the bottom valve.

7. Pressure fluid accumulator as claimed in claim 1, wherein the sealing element is configured as a non-return valve that closes towards the second chamber in the actuated condition of the bottom valve.

8. Pressure fluid accumulator as claimed in claim 1, wherein the closure member includes a second cup seal, wherein said second cup seal engages a second bore within said bottom valve, wherein said first and second bores are separated from one another.

9. Pressure fluid accumulator as claimed in claim 1, wherein the media-separating element is formed of a metallic pleated bellows.

10. Pressure fluid accumulator as claimed in claim 1, further including an elastic part which urges the media-separating element in the direction of the bottom valve.

11. Pressure fluid accumulator as claimed in claim 1, further including a guiding means for centering the media-separating element in the housing.

12. Pressure fluid accumulator as claimed in claim 1, further including a sensor device for sensing the hydraulic fill condition of the accumulator is provided.

13. Pressure fluid accumulator as claimed in claim 12, wherein the sensor device is an inductive travel sensor which includes a coil.

14. Pressure fluid accumulator as claimed in claim 13, further including an electronic evaluating unit for determining the inductance of the coil.

15. Pressure fluid accumulator as claimed in claim 14, wherein a fill condition of the pressure fluid accumulator is determined from the inductance of the coil in an electronic evaluating unit that is associated with the pressure fluid accumulator, by means of characteristic curves stored in the electronic evaluating unit.

16. Pressure fluid accumulator as claimed in claim 13, wherein a d.c. resistance of the coil is determined in an electronic evaluating unit associated with the pressure fluid accumulator.

17. Pressure fluid accumulator as claimed in claim 16, wherein a temperature in the pressure fluid accumulator is determined from the d.c. resistance of the coil by means of characteristic curves stored in an electronic evaluating unit that is associated with the pressure fluid accumulator.

* * * * *